(12) United States Patent
Zhang et al.

(10) Patent No.: US 10,822,480 B2
(45) Date of Patent: Nov. 3, 2020

(54) OLEFIN-BLOCK COPOLYMERS AND THEIR USE IN ELASTOMERIC ARTICLES

(71) Applicant: ExxonMobil Chemical Patents Inc., Baytown, TX (US)

(72) Inventors: Jingwen Zhang, Houston, TX (US); Ian C. Stewart, Houston, TX (US); Jiemin Lu, Manvel, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/122,588

(22) Filed: Sep. 5, 2018

(65) Prior Publication Data

US 2019/0127561 A1 May 2, 2019

Related U.S. Application Data

(60) Provisional application No. 62/577,306, filed on Oct. 26, 2017.

(51) Int. Cl.

| C08F 210/16 | (2006.01) |
|---|---|
| C08F 297/08 | (2006.01) |
| C08F 4/6192 | (2006.01) |
| C08L 23/08 | (2006.01) |
| C08F 4/659 | (2006.01) |

(52) U.S. Cl.
CPC ........ *C08L 23/0815* (2013.01); *C08F 4/6192* (2013.01); *C08F 210/16* (2013.01); *C08F 297/08* (2013.01); *C08F 4/65908* (2013.01); *C08F 4/65912* (2013.01); *C08F 2410/01* (2013.01); *C08F 2500/01* (2013.01); *C08F 2500/03* (2013.01); *C08F 2500/12* (2013.01); *C08F 2500/21* (2013.01); *C08F 2800/10* (2013.01); *C08L 2207/04* (2013.01)

(58) Field of Classification Search
CPC .............. C08L 23/0815; C08L 2207/04; C08F 4/6192; C08F 210/16; C08F 297/08; C08F 4/65908; C08F 4/65912; C08F 2410/01; C08F 2500/01; C08F 2500/03; C08F 2500/12; C08F 2500/21; C08F 2800/12

See application file for complete search history.

(56) References Cited

U.S. PATENT DOCUMENTS

| 8,969,482 | B2 | 3/2015 | Stewart | |
|---|---|---|---|---|
| 9,611,348 | B2 | 4/2017 | Stewart et al. | |
| 2008/0177242 | A1* | 7/2008 | Chang | A61F 13/4902 604/385.01 |
| 2008/0280517 | A1 | 11/2008 | Chang et al. | |
| 2009/0069523 | A1 | 3/2009 | Itakura et al. | |
| 2014/0316085 | A1 | 10/2014 | Stewart et al. | |
| 2018/0079900 | A1 | 3/2018 | Zhang et al. | |

FOREIGN PATENT DOCUMENTS

| KR | 10-1998-0042124 | 8/1998 |
|---|---|---|
| KR | 10-2012-0085201 | 7/2012 |
| WO | 98/57996 | 12/1998 |

OTHER PUBLICATIONS

Tong et al., "Chain Structure, Aggregation State Structure, and Tensile Behavior of Segmented Ethylene-Propylene Copolymers Produced by an Oscillating Unbridged Metallocene Catalyst," Journal of Physical Chemistry B, 2015, vol. 119, No. 19, pp. 6050-6061.
International Search Report and Written Opinion for international application No. PCT/US2018/049581, dated Jan. 11, 2019.

* cited by examiner

*Primary Examiner* — Irina S Zemel
*Assistant Examiner* — Jeffrey S Lenihan
(74) *Attorney, Agent, or Firm* — Catherine L. Bell

(57) ABSTRACT

An elastomeric article comprising an olefin-block copolymer comprising within a range from 4 to 40 mol % of C4 to C12 α-olefin derived units, the remainder being ethylene-derived units, wherein the melting point temperature ($T_{m2}$) is within a range from 92° C. to 120° C., and having an $M_w/M_n$ value of less than 2.5. The olefin-block copolymer is desirably generated by combining ethylene, C4 to C12 α-olefins, a single site catalyst, preferably a fluxional catalyst, and an activator. The elastomeric article may be an elastic hygiene garment, especially a garment comprising a waistband, stretch ear panels and/or belly bands.

23 Claims, 3 Drawing Sheets

OLEFIN-BLOCK COPOLYMERS AND THEIR USE IN ELASTOMERIC ARTICLES

CROSS REFERENCE TO RELATED APPLICATIONS

This application claims priority to and the benefit of U.S. Ser. No. 62/577,306, filed Oct. 26, 2017 and is incorporated by reference herein in its entirety.

FIELD OF THE INVENTION

The present invention(s) relate to olefin-block copolymers and their use in elastomeric articles, especially olefin-block copolymers made using fluxional catalysts.

BACKGROUND

Elastic hygiene applications are dominated by styrenic block copolymers (SBC's), especially in the portions of articles such as diapers where elasticity is needed. Synthesized via living anionic polymerization followed by hydrogenation, most SBC's have well-defined block structures and very narrow molecular weight distributions ($M_w/M_n$). In terms of performance, SBC's tend to maintain their elasticity and durability at a broad range of temperatures, making them ideal for elastic hygiene articles such as baby diapers. Olefinic copolymers such as Vistamaxx™ propylene-based elastomers occupy the market at much smaller market shares due to their defensive elastomeric performance. It would be highly desirable to have an olefinic alternative to styrenic copolymers in elastomeric articles.

We have found that the elastic performance of olefinic copolymers is significantly improved with the use of fluxional catalyzed olefin-block copolymers (OBC's). The use of such catalysts give the polymer a "blocky" characteristic much like a block copolymer. For instance, the elastic performance can be measured in terms of permanent set (PS) values, hysteresis, peak load, and we have found that the PS value of our inventive OBC's described herein at room temperature (23° C.) function as well as or better (lower values of PS) than SBC's and current olefin based copolymers.

References of interest include U.S. Pat. Nos. 8,969,482; 9,611,348; and US 2018/079900.

SUMMARY

Disclosed herein is an elastomeric article comprising (or consisting of, or consisting essentially of) an OBC comprising within a range from 4 to 40 mol % of C4 to C12 α-olefin derived units, the remainder being ethylene-derived units, wherein the melting point temperature ($T_{m2}$) is within a range from 92° C. to 120° C., and having an $M_w/M_n$ value of less than 2.5. The OBC is preferably generated by combining ethylene, C4 to C12 α-olefins, a single site catalyst, and an activator, preferably a fluxional catalyst. The elastomeric article may be an elastic hygiene garment, especially a garment comprising a waistband, stretch ear panels and/or belly bands

DETAILED DESCRIPTION

Figure 1:
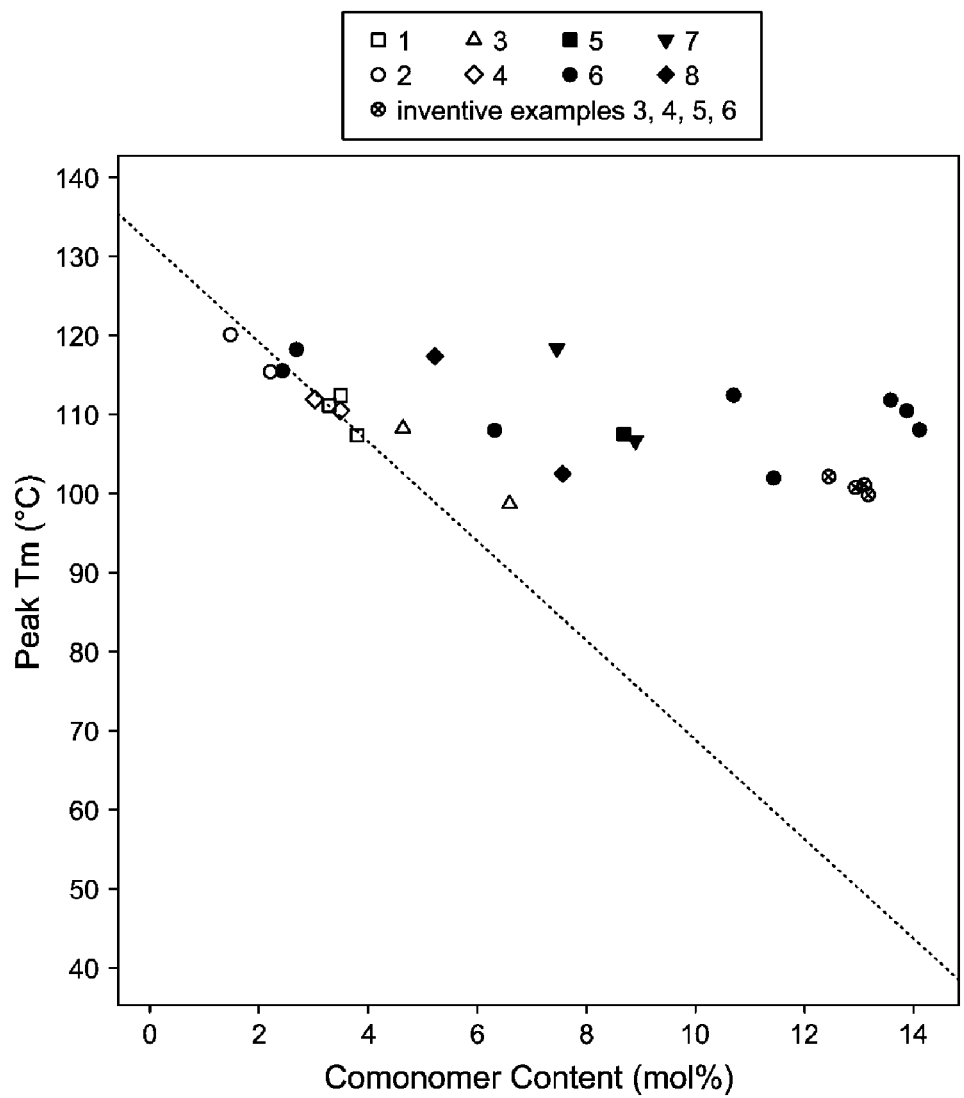
FIG. 1 is a plot of melting point temperature, highest peak value ($T_{m2}$) on the second heating cycle, as a function of comonomer content of some comparative random and block copolymers (U.S. Pat. No. 9,611,348) and inventive copolymers.

As used herein, the inventive OBCs refer to a continuous polymer having distinct "blocks" of monomer/comonomer population (e.g., A-A-A-B-B-B-A-A-A-B-B-B), and/or blend of independent polymer blocks having distinct monomer/comonomer populations (e.g., A-A-A+B-B-B), the copolymer and/or blend comprising at least one block with low comonomer content relative to ethylene content, and at least one block with high comonomer content relative to ethylene content. Preferably the OBC's referred to herein comprise (or consist of) continuous polymers, such as A-A-A-B-B-B-A-A-A-B-B-B.

More particularly, in any embodiment the OBC comprises (or consists of) C4 to C12 α-olefin rich blocks and C4 to C12 α-olefin poor blocks; wherein the C4 to C12 α-olefin rich blocks comprise within a range from 20, or 30, or 40, or 50 or 60 mol % to 65, or 70, or 80 mol % C4 to C12 α-olefin derived units, and wherein the C4 to C12 α-olefin poor blocks comprise within a range from 40, or 30 mol % to 10, or 5 mol % C4 to C12 α-olefin derived units, wherein preferably the rich blocks comprise a greater amount of comonomer-derived units than the poor blocks, most preferably by at least 2, 4, 6, or 8 mol % or more.

As used herein, the term "hydrocarbyl" refers to a radical comprising, or consisting of carbon and hydrogen atoms, preferably no more than 10 or 20 carbons, and when indicated, may be substituted with species such as a halogen, a hydroxyl, carboxyl, oxygen, nitrogen, amine or imine, a sulfur or mercaptan, a phosphorous or phosphate or phosphite, or ionomer moiety.

As used herein, the term "fluxional catalyst" refers to a single-site catalyst such as a metallocene (Group 4 metal, comprising at least one cyclopentadienyl ligand or ligand isolobal to cyclopentadienyl) or metal-salen catalyst (Group 4 metal, ligand(s) comprising phenol, alkoxy, arylimine, arylamine, alkylamine, and/or alkylimine) capable of self-altering, or altering by an external agent, its electronic and/or steric state in order to produce a continuous polymer, or mixture of polymers, incorporating specific monomers depending upon the state, preferably producing a block-like or block copolymer. The U.S. Pat. Nos. 8,969,482 and 9,611,348 patents disclose examples of such fluxional catalysts. In any embodiment, the fluxional catalyst is represented by the formulae:

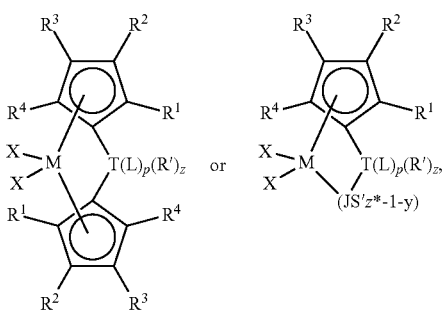

a) where M is titanium, zirconium, or hafnium (preferably hafnium); z is 0, 1, 2, 3, 4, 5, 6, 7, or 8 indicating the number of R' groups bound to the bridging group T, p is 1, 2 or 3 indicating the number of L groups bound to the bridging group T;

b) each X is independently selected from the group consisting of C1 to C10 alkyl group, a C6 to C24 aryl group, or a C7 to C40 alkylaryl group, hydrides, amides, alkoxides, sulfides, phosphides, halides, dienes, amines, phosphines, ethers, and combinations thereof, provided that two X's may form a part of a fused ring or a ring system;

c) T is a bridging group bound to each of the cyclopentadienyl groups;

d) each $R^1$, $R^2$, $R^3$, and $R^4$ is, independently, hydrogen, a hydrocarbyl group, a substituted hydrocarbyl group, an aryl group, a substituted aryl group, or a heteroatom-containing group, provided that any of adjacent $R^1$, $R^2$, $R^3$, and $R^4$ groups may form a fused ring or multicenter fused ring system where the rings may be aromatic, partially saturated or saturated (preferably forming an indenyl or substituted indenyl);

e) each R' is independently hydrogen, a C1 to C10 alkyl group, a C6 to C24 aryl group, or a C7 to C40 alkylaryl group;

f) each L is a heteroatom or heteroatom-containing fluxional group bound to T, and is preferably a hydrocarbyl or substituted hydrocarbyl that has a point of rotation about one or more chemical bonds that allows the group to alter the electronic and/or steric state of the metal center "M" where monomer addition to the growing polymer chain occurs, such alteration resulting in a preponderance of one type of comonomer/monomer combination over another comonomer/monomer combination; and g) $JS'_{z^*-1-y}$ is a heteroatom ligand in which J is a nitrogen, sulfur, oxygen or phosphorous atom (preferably nitrogen); and S' is a radical group which is a hydrocarbyl, substituted hydrocarbyl, or heteroatom (such as a halogen, butyl, pentyl, hexyl, heptyl, octyl, nonyl, decyl undecyl, dodecyl, including isomers thereof such as cyclododecyl); where $z^*$ is the coordination number of the element J, and y is 0 or 1.

In any embodiment, the "L" group is represented by the formula:

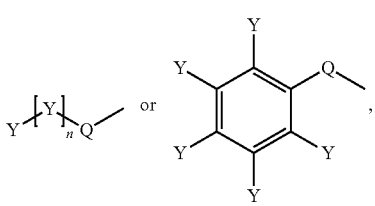

where the open bond is to T in the formula for the fluxional catalyst, and Q is a divalent C1 to C6 hydrocarbyl linker group bound to T; each Y is independently a hydrogen, heteroatom, heteroatom-containing group, C1 to C10 hydrocarbyl, C2 to C12 substituted hydrocarbyl, C6 to C12 aryl, or C7 to C20 substituted aryl, provided that at least one Y in each formula is a heteroatom or heteroatom-containing group; and n is 0, 1, 2, 3, 4, 5 or 6.

The catalyst or catalyst precursor must also be combined with at least one "activator" to effect polymerization of the cyclic olefin monomers and ethylene, wherein the activator preferably comprises an alumoxane activator (such as methalumoxane) or a non-coordinating borate anion associated with a bulky organic cation. In any embodiment, the non-coordinating borate anion comprises a tetra(perfluorinated C6 to C14 aryl)borate anion and substituted versions thereof; most preferably the non-coordinating borate anion comprises a tetra(pentafluorophenyl)borate anion or tetra (perfluoronaphthyl)borate anion.

Preferably the bulky organic cation is selected from the following structures (a) and (b):

wherein each R group is independently hydrogen, a C6 to C14 aryl (e.g., phenyl, naphthyl, etc.), a C1 to C10 or C20 alkyl, or substituted versions thereof; and more preferably at least one R group is an C6 to C14 aryl or substituted versions thereof.

In any embodiment, the bulky organic cation is a reducible Lewis Acid, especially a trityl-type cation (wherein each "R" group in (a) is aryl) capable of extracting a ligand from the catalyst precursor, where each "R" group is an C6 to C14 aryl group (phenyl, naphthyl, etc.) or substituted C6 to C14 aryl, and preferably the reducible Lewis acid is triphenyl carbenium and substituted versions thereof.

Also, in any embodiment, the bulky organic cation is a Brønsted acid capable of donating a proton to the catalyst precursor, wherein at least one "R" group in (b) is hydrogen. Exemplary bulky organic cations of this type in general include ammoniums, oxoniums, phosphoniums, silyliums, and mixtures thereof; preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, and p-nitro-N,N-dimethylaniline; phosphoniums from triethylphosphine, triphenylphosphine, and diphenylphosphine; oxoniums from ethers, such as dimethyl ether diethyl ether, tetrahydrofuran, and dioxane; and sulfoniums from thioethers, such as diethyl thioethers and tetrahydrothiophene, and mixtures thereof.

The catalyst precursor preferably reacts with the activator upon their combination to form a "catalyst" or "activated catalyst" that can then effect the polymerization of monomers.

The catalyst may be formed before combining with monomers, after combining with monomers, or simultaneous therewith.

In any embodiment, the OBC's are produced in a single reactor, most preferably in a single reactor in a single stage of polymerization with a single catalyst component. By "single stage" what is meant is that the reactor conditions are not changed, altered or otherwise effected to produce two or more different types of polymers or to cause the catalyst and activator to behave differently from one "stage" to a next. The reactor can be any type of reactor useful for olefin polymerization such as a gas phase reactor (e.g., fluidized bed, plug flow, continuous riser flow, etc.), a slurry reactor (stirred or loop), a solution phase reactor (stirred or loop), or high pressure or supercritical-type reactor. Most preferably, the olefins, activator and single-site catalyst (or fluxional catalyst) are combined at a temperature within a range from 50, or 60° C. to 100, or 120° C. in s slurry or solution phase process.

Thus, in any embodiment is an elastomeric article comprising (consisting of, consisting essentially of) an OBC comprising within a range from 4, or 6 to 20, or 40 mol % (mole percent relative to the whole polymer) of C4 to C12 α-olefin derived units, the remainder being ethylene-derived units (from 80 to 96 mol %), wherein the melting point temperature ($T_{m2}$) is within a range from 92 or 95° C. to 115 or 120° C., and having an $M_w/M_n$ value of less than 2.5, or 2.4, or 2.3, or within a range from 1.5, or 1.8, or 2.0 to 2.3, or 2.4, or 2.5. In any embodiment, the OBC is generated by combining ethylene, C4 to C12 α-olefins, a single-site catalyst, and an activator. Most preferably the single-site catalyst is a fluxional catalyst.

In any embodiment the OBC has a weight average molecular weight ($M_w$) within a range from 100,000, or 120,000 g/mole to 250,000, or 300,000 g/mole, and a melt index (MI, ASTM D1238 at 2.16 kg/190° C.) of less than 1.4, or 1.2, or 1.0, or 0.8 g/10 min, or an MI within a range from 0.1, or 0.2, or 0.4 g/10 min to 0.8, or 1.0, or 1.2, or 1.4 g/10 min. Such a relationship is exemplified in the data in FIG. 1. In a random copolymer, the expectation is that the melting point temperature would go down along the dashed Mlline as a function of increasing comonomer content. Thus, stated another way, the inventive OBC's have a peak melting point temperature ($T_m$) within a range from 92, or 94° C. to 108 or 110° C. within a range of 4, or 6 mol % to 16, or 20 mol % overall comonomer content.

In any embodiment, the C4 to C12 α-olefin ("comonomer") derived units of the OBC comprise propylene, 1-hexene and/or 1-octene, preferably 1-hexene. Most preferably, the OBC's described herein comprise 1-hexene derived units and the remainder is ethylene derived units, wherein some blocks are rich in the 1-hexene derived units, and other blocks are deficient in 1-hexene derived units. For example, some blocks of the inventive OBC's comprise from 2 to 15 wt % comonomer derived units, the remainder being ethylene derived units, and other blocks comprise from 60 to 70 wt % comonomer derived units, the remainder being ethylene derived units. Preferably, most all blocks will have some comonomer derived units, for instance, at least 2 to 10 wt % by weight of the OBC.

In any embodiment, the OBC has a first permanent set of less than 100, or 80, or 60, or 40% at 23° C. Also in any embodiment, the OBC has a first permanent set of less than 100, or 80, or 60, or 50% at 37° C.

In any embodiment the OBC has a second permanent set of less than 100, or 80, or 60, or 40, or 20% at 23° C. Also in any embodiment the OBC has a second permanent set of less than 100, or 80, or 60, or 40, or 20% at 37° C.

In any embodiment the OBC exhibits a peak load of less than 8 MPa, or 6 MPa, or 4 MPa at 23° C., or within a range from 0.5, or 2, or 3 MPa to 4, or 6, or 8 MPa.

Figure 2:
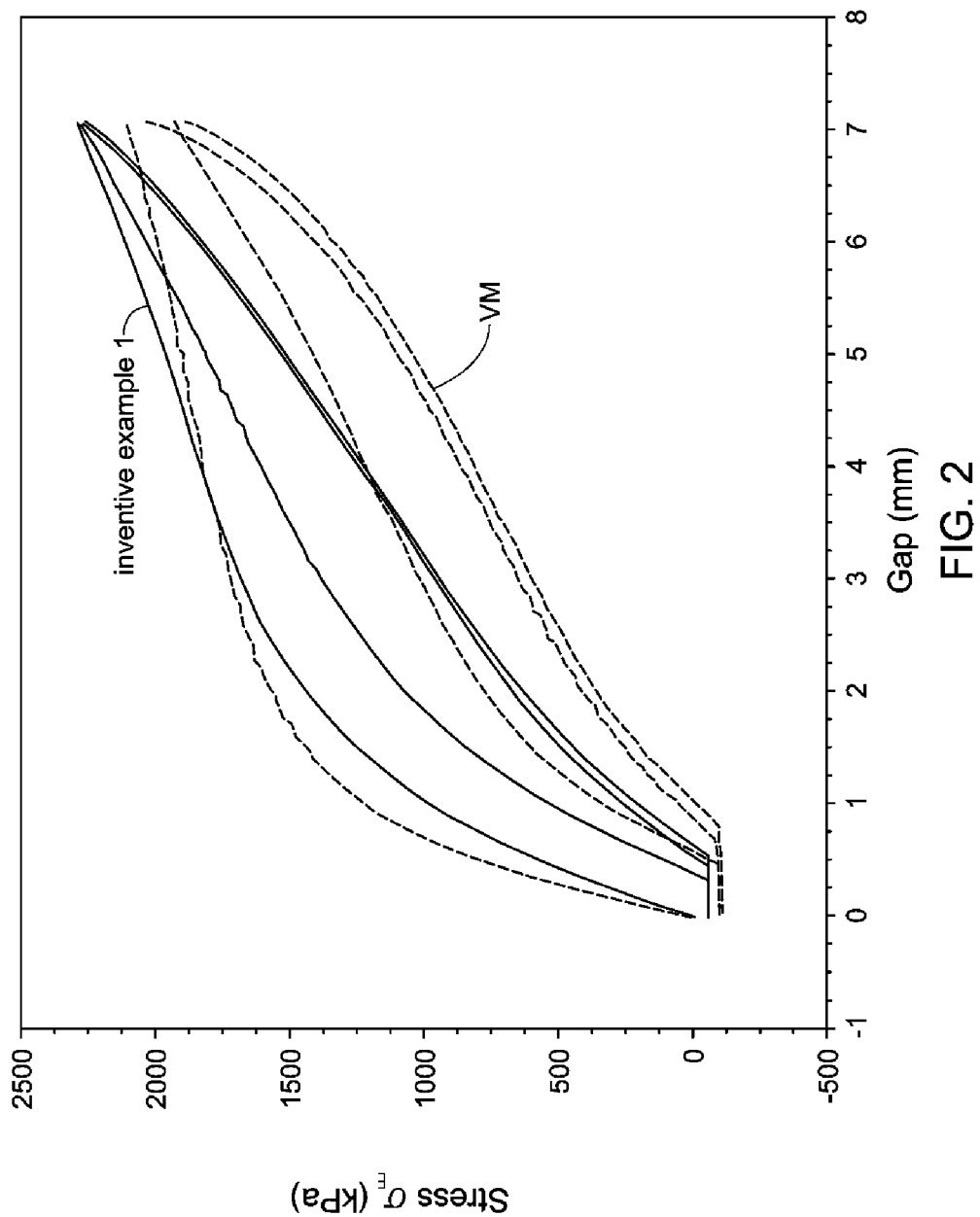
FIG. 2 is a $1^{st}$ and $2^{nd}$ cycle hysteresis plot of stress as a function of gap (mechanical deformation of the solid sample, or strain) using Dynamic Mechanical Thermal Analysis at 23° C. of inventive example 1 and a Vistamaxx™ propylene-based elastomer.
Figure 3:
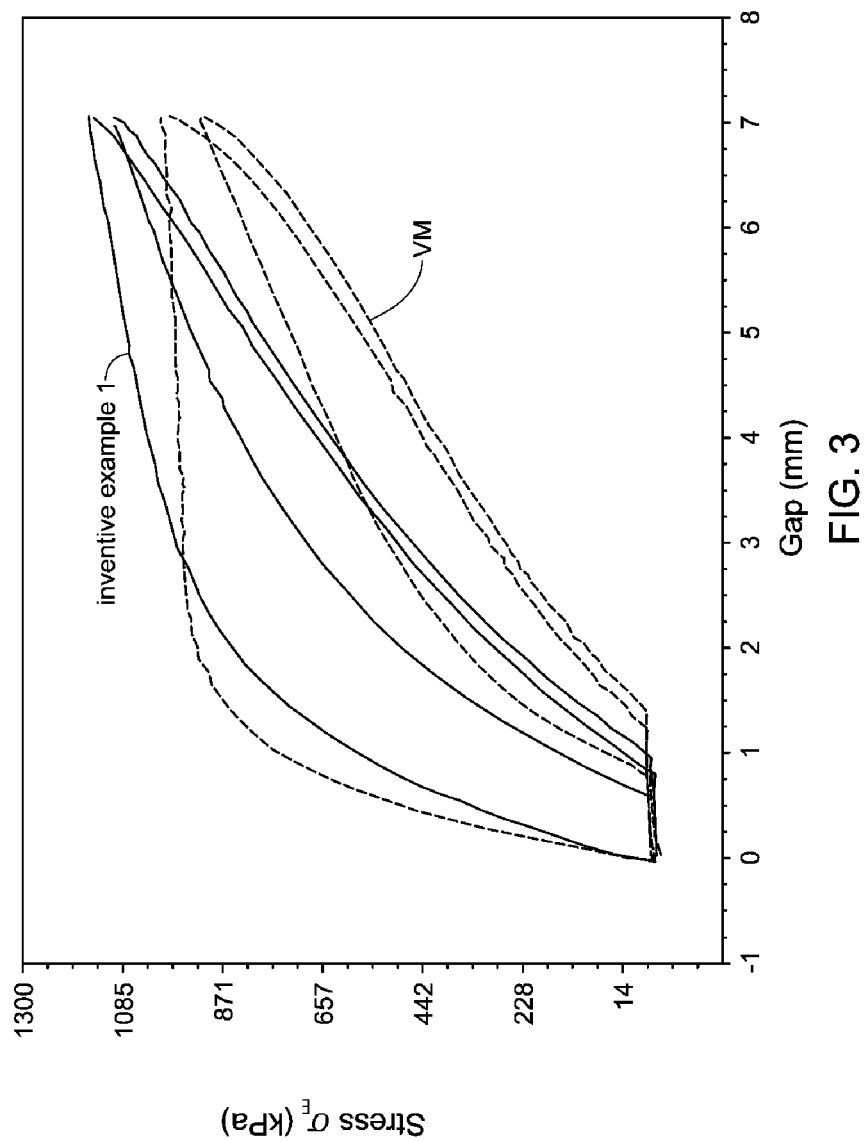
FIG. 3 is a $1^{st}$ and $2^{nd}$ hysteresis plot of stress as a function of gap using Dynamic Mechanical Thermal Analysis at 37° C. of inventive example 1 and a Vistamaxx™ propylene-based elastomer.

In any embodiment the OBC exhibits a mechanical hysteresis of less than 60 or 50% at 37° C., or within a range from 20, or 30% to 50 or 60%. Mechanical hysteresis plots are shown in FIG. 2 and FIG. 3 for example 1 OBC at two different temperature modeling room temperature (23° C.) and human body temperature (37° C.). Preferably, a smaller area within the "banana" shaped plots is an improvement in elastic performance over larger areas.

These properties make the OBC's ideal as an elastomeric article, especially when formed into a film or fibers and fabric, most preferably a non-woven fabric. In any embodiment, the article is an elastic hygiene garment. Examples of such garments include diapers and adult incontinence garments. Such garments comprise at least a waistband, a stretch ear panel and/or belly band. In forming such articles, it is within the scope of the disclosure herein to blend with the OBC's another polymer such as a polypropylene homopolymer, polyethylenes, propylene-based elastomers, ethylene-propylene random copolymers, propylene-based impact copolymers, and other similar types of polymers. In any embodiment, the fibers, fabrics, and/or articles themselves consist essentially of the OBC's described herein.

Elastic articles described herein preferably comprise fibers and fabrics melt-spun from the inventive OBC' s described herein. The elastic fabrics and/or multilayer fabrics useful for such elastic articles may be produced by any suitable melt-spinning process such as spunbond or meltblown processes. "Spunbond" fabrics are filament sheets made through an integrated process of spunbonding, which includes the steps of spinning the molten polymer, air attenuation, deposition (on a drum or other moving base to allow formation of the web, or onto another fabric(s)) and bonding. The method of spunbonding is well known and described generally in, for example, POLYPROPYLENE HANDBOOK 314-324 (E. Moore, Hanser Verlag, 1996). Such fibers range from 5, or 15 μm to 100, or 150 μm in average diameter in certain embodiments, and within a range of 10 to 40 or 50 or 100 μm in particular embodiments. A combination of thickness, fiber fineness (denier), and number of fibers per unit area determines the fabric basis weight which ranges from 8 or 10 or 15 to 50 or 80 or 120 or 400 or 800 g/m² in particular embodiments.

Most spunbonded processes yield a fabric having planar-isotropic properties owing to the random laydown of the fibers. Spunbonded fabrics are generally non-directional and can be cut and used without concern for higher stretching in the bias direction or unraveling at the edges. It is possible to produce non-isotropic properties by controlling the orientation of the fibers in the web during laydown. Fabric thickness can vary from 0.1 to 4.0 mm, and within the range from 0.15 to 1.5 mm in particular embodiments. The method of bonding affects the thickness of the sheets, as well as other characteristics. In particular embodiments, adhesives are absent as bonding agents; thermal-type bonding is preferred. Fiber webs bonded by thermal calendering are thinner than the same web that has been needle-punched, because calendering compresses the structure through pressure, whereas needle-punching moves fibers from the x/y plane of the fabric into the z (thickness) direction.

"Meltblown" fabrics are well known and differ from the traditional spunbonded fabrics by having lower fiber denier (fineness) and by usually being composed of discontinuous filaments. The method of melt blowing is well known and also described in POLYPROPYLENE HANDBOOK. Although meltblown fabrics are not generally referred to as spunbonded, the integration of spinning, attenuation (although slight), laydown, and bonding during the production of meltblown webs describes a process traditionally defined as spun bonding. The inherent fiber entanglement often makes additional bonding unnecessary, however. Fibers produced by melt blowing are very fine, having typical diameters of less than 7 μm, typically smaller than spunbonded fibers. The fibers are extremely fine and largely unoriented, causing the webs to be quite weak and easily distorted. In the manufacture of meltblown fabrics, a special die is used in which heated, pressurized air attenuates the molten polymer filament as it exits the orifice of the die or nozzle. Air temperatures range from 260° C. to 300, or 340, or 380, or 420, or 480° C. with sonic velocity flow rates. The melt pressure within the die itself may be greater than 500 psi (3.45 MPa), allowing for relatively low melt flow rate (less than 30 dg/min) polymers to be meltblown without visbreaking (treating with a peroxide that causes chain-scissioning and lowering of the molecular weight).

Examples of suitable meltblowing equipment for producing the elastic meltblown fabrics (and the elastic fibers that make up the fabrics) described herein are in U.S. Pat. Nos. 4,380,570; 5,476,616; and by R. Zhao, "Melt Blowing Polyoxymethylene Copolymer" in INTERNATIONAL NONWOVENS J. 19-24 (Summer 2005). A desirable meltblowing apparatus will typically include at least one extruder, and may include a gear pump to maintain melt pressure within the apparatus. The extruder is coupled to at least one die block, or array die, such that the melt from the extruder can be transferred to the die block. There may be more than one array die. The array die includes a spinneret portion and is coupled also to at least one air manifold for delivering high pressure air to the spinneret portion of the die. The spinneret includes a plurality of spinning nozzles through which the melt is extruded and simultaneously attenuated with air pressure to form filaments, or fibers.

The meltblown fibers that form one or more layers of the multilayer constructions herein are formed by extruding the molten copolymer through a plurality of fine, usually circular, die capillaries or "spinning nozzles" as molten threads or filaments into converging, usually hot and high velocity, gas streams (e.g., air or nitrogen) to attenuate the filaments of molten thermoplastic material and form fibers. During the meltblowing process, the diameters of the molten filaments are reduced by the drawing air to a desired size. Thereafter, the meltblown fibers are carried by the high velocity gas stream and are deposited on a collecting surface to form at least one web of randomly disbursed meltblown fibers. The meltblown fibers may be continuous or discontinuous and are generally within the range from 5 to 250 μm in average diameter.

More particularly, in the meltblowing process useful for forming the elastic meltblown fabrics, molten OBC's is provided to at least one array die that is disposed between a pair of air plates, one being the top plate, that form one or more primary air nozzles. In any embodiment, the meltblowing apparatus includes an array die with a plurality of spinneret nozzles (or "nozzles"), the nozzle density within the range from 20 or 30 or 40 to 200 or 250 or 320 holes/inch. In any embodiment, each nozzle has an inside diameter within the range from 0.039, or 0.05, or 0.10, or 0.20, or 0.23, or 0.40, or 0.60, or 0.66, to 0.80 or 1.00 mm. The air plates in any embodiment are mounted in a recessed configuration such that the tips of the spinning nozzles are set back from the primary air nozzle. In another embodiment, air plates are mounted in a flush configuration where the air plate ends are in the same horizontal plane as the tip of the spinning nozzles. In yet other embodiments, the spinning nozzle tips are in a protruding or "stick-out" configuration so that the tip of the spinning nozzles extends past the ends of the air plates. Moreover, more than one air flow stream can be provided for use in the nozzles. A die or array die may be directly heated or indirectly heated. For example, dies or array dies may be directly heated via conventional electric methods or by hot air.

In any embodiment, hot air ("primary air") is provided through the primary air nozzle located at least on each side of the die tip. The hot air heats the die and thus prevents the die from becoming clogged with solidifying polymer as the molten polymer exits and cools. The hot air also draws, or attenuates, the melt into fibers. Secondary, or quenching, air at temperatures above ambient can also be provided through the die head. Primary air flow rates typically range from about 1 to about 50 or from about 10 to about 30 or from about 20 to 24 standard cubic feet per minute per inch of die width (SCFM/inch). In certain embodiments, the primary air pressure in the meltblown process typically ranges from 2 or 5 to 10 or 15 or 20 or 30 pounds per square inch gauge (psig) at a point in the die head just prior to exit. Primary air temperatures are typically within the range from 200 or 230 to 300 or 320 or 350° C. in certain embodiments.

The melt temperature of the OBC's used to make the elastic meltblown fabrics described herein is from greater than that to form a melt of the OBC's (and any other components) and below the decomposition temperature of the OBC's (and any other components), and in certain embodiments is within the range from 50 or 100 or 150° C. to 250 or 280 or 300° C. In yet other embodiments, the melt temperature is from less than 150 or 200 or 220 or 230 or 250 or 260 or 270 or 280° C. The OBC's may be formed into fibers at a melt pressure from greater than 500 psi (3.45 MPa) or 750 psi (5.17 MPa) or 1000 psi (6.89 MPa), or within the range from 500 psi (3.45 MPa) or 750 psi (5.17 MPa) to 1000 psi (6.89 MPa) or 2000 psi (13.78 MPa) in other embodiments. Thus, the meltblowing apparatus must be able to generate and withstand such pressures to spin the OBC's into the fabrics and multilayer constructions described herein.

Expressed in terms of the amount of composition flowing per hole of the die per unit of time, throughputs for the manufacture of elastic meltblown fabrics using the compositions described herein are typically within the range from 0.1 or 0.2 or 0.3 to 1.0 or 1.25 or 2.0 or 3.0 or more grams per hole per minute (ghm). Thus, for a die having 30 holes per inch, polymer throughput is typically greater than about 0.1 lbs/inch/hour (PIH), or greater than about 0.3 (PIH) or greater than about 1.0 (PIH) or from about 1 to about 12 (PIH), or from 2 to 5 (PIH), or from 7 or 8 (PIH).

Because such high temperatures can be used, a substantial amount of heat is desirably removed from the fibers in order to quench, or solidify, the fibers leaving the nozzles. Cold gases of air or nitrogen can be used to accelerate cooling and solidification of the meltblown fibers. In particular, cooling ("secondary") air flowing in a cross-flow direction (perpendicular or angled) relative to the direction of fiber elongation, may be used to quench meltblown fibers and produce smaller diameter fibers. Also, an additional, cooler pressurized quench air may be used and can result in even faster cooling and solidification of the fibers. In certain embodiments, the secondary cold air flow may be used to attenuate the fibers. Through the control of air and array die temperatures, air pressure, and polymer feed rate, the diameter of the fiber formed during the meltblown process may be regulated.

In certain embodiments, meltblown fibers produced herein have a diameter within the range from 5 or 6 or 8 or 10 to 20 or 50 or 80 or 100 or 150 or 200 or 250 μm in average diameter, and in other embodiments have a diameter from less than 80 or 50 or 40 or 30 or 20 or 10 or 5 μm.

After or during cooling, the elastic meltblown fibers are collected to form an elastic meltblown fabric. In particular, the fibers are collected on any desirable apparatus as is known in the art such as a moving mesh screen, moving belt or collecting (smooth or patterned/embossed) drum(s) or calendar roll(s) located below or across from the nozzles. In order to provide enough space beneath the spinning nozzles for fiber forming, attenuation and cooling, forming distances from 4 inches to 2 feet between the polymer nozzle tips and the top of the mesh screen or collecting drum are required.

The elastic meltblown fabric is formed directly upon other types of fabrics such as spun laced or carded fabrics. These fabrics may have a basis weight within the range of from 10 or 20 or 30 to 50 or 80 or 100 or 150 g/m². In this manner, multilayer constructions can be formed having structures such as MM, SS, MSM, MS, MX, SMS, MXM, XSX, XMX, XMMX, SMXS, SMMS, SSMXS, SSMMS, SSXS, SXS, SSMMXS, SMMMS, SSMMMS, XMSMX, and many others, wherein "X" represents a layer of spunlace or carded fabric (where each "X" in a construction may be the same or different), "M" represents a layer of the present elastic meltblown fabric (where each "M" in a construction may be the same or different), and "S" represents a spunbond fabric (where each "S" in a construction may be the same or different). In certain embodiments, at least the "M" and one adjacent layer are adhered to one another, in other embodiments, at least the "M" and two adjacent layers are adhered. When such adhering of the elastic meltblown fibers to another fabric is desired, the secondary cooling air flow may be diminished and/or heated to maintain some of the melt quality and hence bonding ability of the forming elastic meltblown fibers to the fabrics upon which they are bonded.

More particularly, in forming a multilayered construction, the OBC's may be meltblown onto spunlace fabrics that are passed underneath or in front of the forming elastic meltblown fabric. The melt temperature and distance between the spinnerets and the passing spunlace fabrics are adjusted such that the fibers are still in a melt or partial melt state when contacting the fabrics to form a two or three layer construction. The coated fabrics then have the melted or partially-melted elastic meltblown fibers/fabric adhered thereto.

The various descriptive elements and numerical ranges disclosed herein for the inventive articles and OBCs can be combined with other descriptive elements and numerical ranges to describe the invention(s); further, for a given element, any upper numerical limit can be combined with any lower numerical limit described herein, including the examples in jurisdictions that allow such combinations. The features of the invention(s) are demonstrated in the following non-limiting examples.

EXAMPLES

Olefin-block copolymers ("OBC's") were synthesized by combining ethylene and 1-hexene with the fluxional catalyst rac-(2-methoxyphenyl)(methyl)silyl-bis(indenyl) hafnium dimethyl and the activator triphenylcarbenium tetrakis(pentafluorophenyl)borate as described in U.S. Pat. Nos. 8,969,482 and 9,611,348 to produce ethylene-hexene multiblock copolymers with comonomer poor and comonomer rich block. The comonomer poor block contain less hexene comonomer and the comonomer rich block contain more hexene comonomer. Some of their properties are included in Table 1. The $T_{m2}$ as a function of comonomer content is plotted in FIG. 1, along with those of examples disclosed in U.S. Pat. No. 9,611,348. The straight dashed line indicates the theoretical behavior of purely random copolymers.

Exact™ 3132 plastomer (EX) (ExxonMobil Chemical Company) is a random ethylene-hexene copolymer with otherwise similar composition as the invention samples and is a comparative example. Vistamaxx™ 6102FL propylene-based elastomer (VM) (ExxonMobil Chemical Company) is an ethylene-propylene random copolymer comparative example. Also, Kraton™ G1657 styrenic block copolymer (KR) (Kraton Corporation), and Infuse™ D9107 olefin block copolymer (IN) (Dow Chemical Company) were studied as comparison copolymers to the inventive examples. Some of the properties of these random copolymers are included in Table 2.

TABLE 1

Inventive olefin-block copolymer examples

| Example OBC | $T_{m1}$, °C. | $T_{m2}$, °C. | C6, mol % | MI (g/10 min) | $M_n$ (g/mol) | $M_w$ (g/mol) | $M_w/M_n$ |
|---|---|---|---|---|---|---|---|
| 1 | 9.6 | — | 15.1 | 0.412 | 69,406 | 140,163 | 2.0 |
| 2 | 52.9 | — | 11.3 | — | 86,094 | 181,984 | 2.1 |
| 3 | 39.7 | 101.6 | 13.1 | 0.188 | 69,484 | 156,112 | 2.2 |
| 4 | 41.7 | 102.3 | 12.8 | 0.239 | 65,729 | 145,917 | 2.2 |
| 5 | 42.5 | 102.8 | 13.0 | 0.447 | 62,405 | 131,842 | 2.1 |
| 6 | 45.1 | 103.9 | 12.3 | 0.525 | 62,136 | 130,850 | 2.1 |

TABLE 2

Comparative copolymers

| Material | C2 wt % | comonomer | MI (g/10 min) | $M_n$ (g/mol) | $M_w$ (g/mol) | $M_w/M_n$ |
|---|---|---|---|---|---|---|
| VM | 16 | Propylene | 1.4 | 112,136 | 231,192 | 2.1 |
| EX | 84 | Hexene | 1.2 | 45,363 | 116,849 | 2.6 |
| KR | 87 | Styrene | 22.0 | 45,073 | 54,888 | 1.2 |
| IN | 72 | Octene | 1.0 | 66,254 | 157,093 | 2.4 |

Melting Point Determinations

Differential Scanning calorimetry (DSC) was carried out on the OBCs and blends using a TA Instrument Model Q-200. Measurements were carried out by placing a sample of the polymer in a zero hermetic pan and encapsulated with lid using a pan press. The sample was placed upon a disc on a platform in the DSC cell. An empty reference pan was placed on a symmetric platform in the DSC cell. Heat flow was measured by comparing the difference in temperature across the sample and the reference. Sample sizes were from 3.5 mg to 5 mg and were heated at rate of 10° C./min from −90° C. to 220° C. in nitrogen gas flowing at a rate of 50 ml/min. The samples were first heated from 23° C. to 220° C. to remove any thermal history. Then they were cooled from 220° C. to −70° C., then heated back up from −70° C. to 220° C. (second heating processes). Two melting point transitions were typically observed, one below 60° C. ($T_{m1}$) and another above 80° C. ($T_{m2}$) except in examples 1 and 2 where only a lower melting point temperature was observed. Both melting point temperatures were recorded during the second heating step. Temperature values are determined within ±0.4° C.

Molecular Weight Determinations

Agilent GPC-PL-220 with differential refractive index. Number average molecular weight ($M_n$) determinations were made using a High Temperature GPC (Agilent PL-220), equipped with three in-line detectors, a differential refractive index detector (DRI), a light scattering (LS) detector, and a viscometer (not used here). Detector calibration is described in a paper by T. Sun, P. Brant, R. R. Chance, and W. W. Graessley, in 34(19) MACROMOLECULES 6812-6820 (2001) and references therein. Three Agilent PLgel 10 μm Mixed-B LS columns were used for the GPC tests herein. The nominal flow rate was 0.5 mL/min, and the nominal injection volume was 300 μL. The various transfer lines, columns, viscometer and differential refractometer (the DRI detector) were contained in an oven maintained at 145° C. Solvent for the experiment was prepared by dissolving 6 grams of butylated hydroxytoluene as an antioxidant in 4 liters of Aldrich reagent grade 1,2,4-trichlorobenzene (TCB). The TCB mixture was then filtered through a 0.1 μm polytetrafluoroethylene filter. The TCB was then degassed with an online degasser before entering the GPC. Polymer solutions were prepared by placing dry polymer in a glass container, adding the desired amount of TCB, then heating the mixture at 160° C. with continuous shaking for about 2 hours. All quantities were measured gravimetrically. The TCB densities used to express the polymer concentration in mass/volume units were 1.463 g/ml at 23° C. and 1.284 g/ml at 145° C. The injection concentration was from 0.5 to 2.0 mg/ml, with lower concentrations being used for higher molecular weight samples. Prior to running each sample the DRI detector and the viscometer were purged. The flow rate in the columns was then increased to 0.5 ml/minute, and the DRI was allowed to stabilize for 8 hours before injecting the first sample. The LS laser was turned on at least 1 to 1.5 hours before running the samples. The concentration, c, at each point in the chromatogram was calculated from the baseline-subtracted DRI signal, $I_{DRI}$, using the following equation:

$$c = K_{DRI} I_{DRI}/(dn/dc),$$

where $K_{DRI}$ is a constant determined by calibrating the DRI, and (dn/dc) is the incremental refractive index for the system. The refractive index, n, was 1.500 for TCB at 145° C. and λ was 690 nm. Units of molecular weight are expressed in kg/mole or g/mole, and intrinsic viscosity is expressed in dL/g.

The LS detector was a Wyatt Technology High Temperature Dawn Heleos. The molecular weight, M, at each point in the chromatogram was determined by analyzing the LS output using the Zimm model for static light scattering (W. Burchard & W. Ritchering, "Dynamic Light Scattering from Polymer Solutions," in 80 PROGRESS IN COLLOID & POLYMER SCIENCE 151-163 (Steinkopff, 1989)) and determined using the following equation:

$$\frac{K_o c}{\Delta R(\theta)} = \frac{1}{M P(\theta)} + 2 A_2 c.$$

Here, $\Delta R(\theta)$ is the measured excess Rayleigh scattering intensity at scattering angle θ, "c" is the polymer concentration determined from the DRI analysis, $A_2$ is the second virial coefficient, $P(\theta)$ is the form factor for a mono-disperse random coil, and $K_o$ is the optical constant for the system, as set forth in the following equation:

$$K_o = \frac{4\pi^2 n^2 (dn/dc)^2}{\lambda^4 N_A},$$

where $N_A$ is Avogadro's number, and (dn/dc) is the incremental refractive index for the system, which takes the same value as the one obtained from DRI method, and the value of "n" is as above. For saturated aliphatic polyolefins such as PE/PP homopolymer and copolymers with or without long chain branching, the do/dc=0.1048.

All molecular weights are weight average unless otherwise noted. All molecular weights are reported in g/mol unless otherwise noted.

Polymer Char GPC-IR with infrared light. Weight average molecular weight ($M_w$) determinations were made using a high temperature GPC (Polymer Char GPC-IR) equipped with a multiple-channel band-filter based Infrared detector IR5, an 18-angle light scattering detector and a viscometer (not used here). Three Agilent PLgel 10 μm Mixed-B LS columns were used to provide polymer separation. Aldrich reagent grade TCB with 300 ppm of the antioxidant butylated hydroxytoluene was used as the mobile phase. The TCB mixture was filtered through a 0.1 μm polytetrafluoroethylene filter and degas sed with an online degasser before entering the GPC instrument. The nominal flow rate was 1.0 mL/min and the nominal injection volume is 200 μL. The whole system including transfer lines, columns, detectors were contained in an oven maintained at 145° C. A given amount of polymer sample was weighed and sealed in a standard vial with 80 μL flow marker (heptane) added to it. After loading the vial in the autosampler, polymer was automatically dissolved in the instrument with 8 mL added TCB solvent. The polymer was dissolved at 160° C. with continuous shaking for about 1 hour for most polyethylene samples or 2 hour for polypropylene samples. The TCB densities used in concentration calculation were 1.463 g/ml at room temperature and 1.284 g/ml at 145° C. The sample solution concentration was from 0.2 to 2.0 mg/ml, with lower concentrations being used for higher molecular weight samples.

The concentration "c" at each point in the chromatogram was calculated from the baseline-subtracted IR5 broadband signal intensity "I" using the following equation:

$$c = \beta I,$$

where β is the mass constant determined with polyethylene or polypropylene standards. The mass recovery was calculated from the ratio of the integrated area of the concentration chromatography over elution volume and the injection mass which is equal to the pre-determined concentration multiplied by injection loop volume.

The conventional molecular weight (IR molecular weight "M") was determined by combining universal calibration relationship with the column calibration which was performed with a series of monodispersed polystyrene standards ranging from 700 g/mole to 10,000,000 g/mole. The molecular weight "M" at each elution volume was calculated with following equation:

$$\log M = \frac{\log(K_{PS}/K)}{a+1} + \frac{a_{PS}+1}{a+1} \log M_{PS},$$

where the variables with subscript "PS" stands for "polystyrene" while those without a subscript are for the test samples. In this method, a$_{PS}$ is 0.67 and K$_{PS}$ is 0.000175 while "a" and "K" are calculated from a series of empirical formula established in the literature (Sun et al., as above). The value of a/K is 0.695/0.000579 for polyethylene and 0.705/0.0002288 for polypropylene.

The comonomer composition is determined by the ratio of the IR5 detector intensity corresponding to $CH_2$ and $CH_3$ channel calibrated with a series of polyethylene and polypropylene homo/copolymer standards whose nominal value are predetermined by NMR or FTIR such as an ExxonMobil Chemical Company commercial grade of LLDPE, polypropylene, etc.

The parameters used in this study are shown below:
PE-EH block copolymer: K is 0.000428, "a" is 0.695, dn/dc is 0.1048, A2 is 0.0015
Exact™ 3132 plastomer: K is 0.000516, "a" is 0.695, dn/dc is 0.1048, A2 is 0.0015
Kraton™ G1657 styrenic copolymer: K is 0.000579, "a" is 0.695, dn/dc is 0.1048, A2 is 0.0015
Infuse™ D9107 olefin block copolymer: K is 0.000392, "a" is 0.695, dn/dc is 0.1048, A2 is 0.0015VM 6102 via GPC-4D: K is 0.000276, and "a" is 0.703.

Melt Index Determinations

The melt index ("MI") was measured according to ASTM D1238 at 190° C., 2.16 kg, and determined within ±0.1 g/10 min.

Elastomeric Property Determinations

The elastomeric properties of the OBCs was measured and compared to elastomeric random copolymers through hysteresis tests. In such tests, all samples were compression molded at 170° C. followed by 2-day and 7-day aging at 23° C. The tensile testing was conducted using Dynamic Mechanical Thermal Analysis (DMTA) using a TA Instrument RSA-G2 with dumbbell shape specimen measured at 3.5 mm (length)×2.5 mm (width)×0.25 mm (thickness). The specimen was pre-stretched at 0.1 N and underwent two stretch cycles up to 200% strain without sample removal from the grips at 0 seconds holding (force relaxation) under 23° C. and 37° C. The pulling rate was 10 mm/min for tensile testing. One specimen was tested for each material under each condition. The following parameters were measured and recorded:
first cycle permanent set (PS) is the first cycle unloading strain at 0N load;
second cycle PS is the second cycle unloading strain at 0N load—second cycle loading strain at 0N load;
Peak load is the load at first cycle strain;
Mechanical hysteresis is the (first loading stress at 100% strain minus the first unloading stress at 100% strain)/(first loading stress at 100% strain).

Detailed hysteresis testing values are listed in Tables 3 (23° C.) and 4 (37° C.), which compare typical room temperature conditions and typical human body temperature conditions.

The hysteresis testing compared first PS values of EX, VM and inventive examples 1 to 6 series under 23° C. and 37° C. respectively. The EX and VM are highlighted in black and example 1 are highlighted in green. From the comparison, we can see that the first PS of example 1 showed significant improvement than EX and VM. The first PS values are improved by 54.9% and 38.8% under 23° C. and 37° C. respectively as compared to VM. The data is summarized in Table 3.

The hysteresis testing also compared second PS values of EX, VM and inventive examples 1 to 6 under 23° C. and 37° C. respectively. The second PS improved by 46.6% and 34.2% under 23° C. and 37° C. respectively as compared to VM for elastic hygiene application. The data is summarized in Table 3.

The first hysteresis values of EX, VM and example 1. The mechanical hysteresis values of example 1 improved by 26.4% and 34.1% under 23° C. and 37° C. respectively as compared with VM.

The first peak load values of EX, VM and example 1 are also shown in Table 3. Under 23° C., the peak load of example 1 increased by 12.3% and under 37° C., the peak load of example 1 improved by 40.9% for softer stretch in elastic hygiene compared to the values of VM.

FIG. 2 and FIG. 3 show first and second cycle hysteresis overlay at 23° C. and 37° C. for example 1 and VM respectively. The area inside the hysteresis curve is related to the elastomeric properties. The smaller the area inside the hysteresis loop, the better the elastomeric properties. The inventive sample example 1 showed better elastomeric properties over VM under both 23° C. and 37° C.

Hysteresis testing of the samples also compared first PS values of the example 1 with KR, VM and IN polymers under 23° C. and 37° C., respectively. At 23° C., the first PS value of example 1 was even better than that of the KR. At 37° C., the first PS value of example 1 was significantly better than those of the VM and IN polymers. These results demonstrate the potential application of the fluxional-catalyst produced OBCs in the elastic hygiene market.

TABLE 3

DMTA studies at room temperature

| 23° C. | first PS, % | second PS, % | Mechanical hysteresis, % | Peak load, kPa |
|---|---|---|---|---|
| 1 | 12.4 | 7.1 | 38.0 | 2,283 |
| 2 | 38.2 | 16.0 | 66.3 | 4,373 |
| 3 | 21.2 | 12.9 | 53.5 | 3,281 |
| 4 | 29.1 | 16.6 | 60.1 | 3,668 |
| 5 | 20.2 | 9.6 | 54.1 | 3,094 |
| 6 | 31.2 | 15.2 | 61.0 | 3,584 |
| EX | 122.6 | 20.1 | 98.3 | 9,752 |
| VM | 27.5 | 13.3 | 51.6 | 2,029 |
| KR | 14.7 | 6.3 | 19.6 | 1,465 |
| IN | 28.3 | 14.0 | 52.5 | 1,415 |

TABLE 4

DMTA studies at body temperature

| 37° C. | first PS, % | second PS, % | Mechanical hysteresis, % | Peak load, kPa |
|---|---|---|---|---|
| 1 | 25.1 | 13.1 | 43.4 | 1,201 |
| 2 | 35.4 | 11.3 | 54.2 | 3,231 |
| 3 | 22.9 | 11.9 | 45.3 | 2,115 |
| 4 | 21.0 | 10.9 | 47.3 | 2,418 |
| 5 | 21.3 | 9.2 | 44.7 | 1,899 |
| 6 | 25.6 | 10.8 | 49.0 | 2,442 |
| EX | 118.2 | 20.8 | 98.3 | 8,018 |
| VM | 41.0 | 19.9 | 65.9 | 920 |
| KR | 18.3 | 8.4 | 23.6 | 1,382 |
| IN | 35.2 | 15.0 | 55.1 | 1,210 |

Also disclosed is the use of a fluxional catalyst to form an olefin-block copolymer to form into elastomeric articles as described in any embodiment herein.

Also disclosed is the use of an olefin-block copolymer made in a process using a fluxional catalyst in an elastomeric article.

As used herein, "consisting essentially of" means that the claimed article includes only the named components and no additional components that will alter its measured properties by any more than 20, or 15, or 10%, and most preferably means that "additives" are present, if at all, to a level of less than 5, or 4, or 3, or 2 wt % by weight of the composition. Such additional additives can include, for example, inorganic fillers (such as talc, glass, and other minerals), carbon black, nucleators, clarifiers, colorants (soluble and insoluble), foaming agents, antioxidants, alkyl-radical scavengers (preferably vitamin E or other tocopherols and/or tocotrienols), anti-ultraviolet light agents, acid scavengers, curatives and cross-linking agents, mineral and synthetic oils, aliphatic and/or cyclic containing oligomers or polymers (and other "hydrocarbon resins"), and other additives well known in the art.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. An elastomeric article comprising an olefin-block copolymer comprising within a range from 4 to 40 mol % of C4 to C12 α-olefin derived units, the remainder being ethylene-derived units, wherein the olefin-block copolymer has a melting point temperature ($T_{m2}$) from 92° C. to 120° C. and an $M_w/M_n$ value of less than 2.5, wherein the olefin-block copolymer comprises a plurality of first blocks comprising from 20 mol % to 80 mol % of C4 to C12 α-olefin derived units and a plurality of second blocks comprising from 40 mol % to 5 mol % of C4 to C12 α-olefin derived units, wherein the first blocks comprise a greater amount of comonomer-derived units than the second blocks by at least 2 mol %.

2. The elastomeric article of claim 1, wherein the olefin-block copolymer is generated by combining ethylene, at least one C4 to C12 α-olefin, a single-site catalyst, and an activator.

3. The elastomeric article of claim 1, wherein the olefin-block copolymer has a $M_w$ within a range from 100,000 g/mole to 300,000 g/mole and a melt index (MI) of less than 1.4 g/10 min.

4. The elastomeric article of claim 1, wherein the olefin-block copolymer has a peak melting point temperature ($T_m$) within a range from 92° C. to 110° C. and the olefin-block copolymer has 4 mol % to 20 mol % overall comonomer content.

5. The elastomeric article of claim 1, wherein the C4 to C12 α-olefin derived units comprise 1-hexene or 1-octene.

6. The elastomeric article of claim 1, wherein the olefin-block copolymer has a first permanent set of less than 100% at 23° C.

7. The elastomeric article of claim 1, wherein the olefin-block copolymer has a first permanent set of less than 100% at 37° C.

8. The elastomeric article of claim 1, wherein the olefin-block copolymer has a second permanent set of less than 100% at 23° C.

9. The elastomeric article of claim 1, wherein the olefin-block copolymer has a second permanent set of less than 100% at 37° C.

10. The elastomeric article of claim 1, wherein the olefin-block copolymer exhibits a peak load of less than 8 MPa at 23° C.

11. The elastomeric article of claim 1, wherein the olefin-block copolymer exhibits a mechanical hysteresis of less than 60% at 37° C.

12. The elastomeric article of claim 1, wherein the olefin-block copolymer is produced in a single stage in a single reactor using only one single-site catalyst.

13. The elastomeric article of claim 12, wherein the single-site catalyst is a fluxional catalyst represented by the formula:

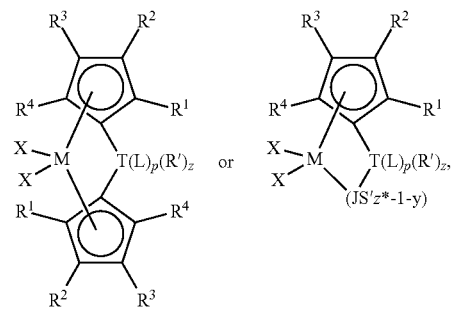

where M is titanium, zirconium, or hafnium; z is 0, 1, 2, 3, 4, 5, 6, 7, or 8 indicating the number of R' groups bound to the bridging group T, p is 1, 2 or 3 indicating the number of L groups bound to the bridging group T;

each X is independently selected from the group consisting of C1 to C10 alkyl group, a C6 to C24 aryl group, or a C7 to C40 alkylaryl group, hydrides, amides, alkoxides, sulfides, phosphides, halides, dienes, amines, phosphines, ethers, and combinations thereof, provided that two X's may form a part of a fused ring or a ring system;

T is a bridging group bound to each of the cyclopentadienyl groups;

each $R^1$, $R^2$, $R^3$, and $R^4$ is, independently, hydrogen, a hydrocarbyl group, a substituted hydrocarbyl group, an aryl group, a substituted aryl group, or a heteroatom-containing group, provided that any of adjacent $R^1$, $R^2$, $R^3$, and $R^4$ groups may form a fused ring or multicenter fused ring system where the rings may be aromatic, partially saturated or saturated;

each R' is independently hydrogen, a C1 to C10 alkyl group, a C6 to C24 aryl group, or a C7 to C40 alkylaryl group;

each L is a heteroatom or heteroatom-containing fluxional group bound to T; and $JS'_{z^*-1-y}$ is a heteroatom ligand in which "J" is a nitrogen, sulfur, oxygen or phosphorous atom; and S' is a radical group which is a hydrocarbyl, substituted hydrocarbyl, or heteroatom; where z*is the coordination number of the element "J", and y is 0 or 1.

14. The elastomeric article of claim 13, wherein the "L" group is represented by the formula:

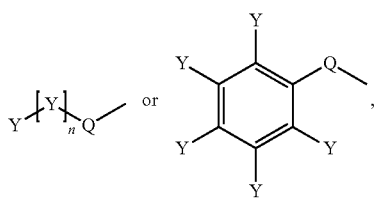

where the open bond is to T, and Q is a divalent C1 to C6 hydrocarbyl linker group bound to T; each Y is independently a hydrogen, heteroatom, heteroatom-containing group, C1 to C10 hydrocarbyl, C2 to C12 substituted hydrocarbyl, C6 to C12 aryl, or C7 to C20 substituted aryl, provided that at least one Y in each formula is a heteroatom or heteroatom-containing group; and n is 0, 1, 2, 3, 4, 5 or 6.

15. The elastomeric article of claim 1, wherein the article is an elastic hygiene garment.

16. The elastomeric article of claim 15, wherein the garment comprises waistband, a stretch ear panel and/or belly band.

17. The elastomeric article of claim 1, wherein the plurality of second blocks comprise from 40 mol % to 10 mol % of the C4 to C12 α-olefin derived units.

18. The elastomeric article of claim 1, wherein the first blocks comprise a greater amount of comonomer-derived units than the second blocks by at least 4 mol %.

19. The elastomeric article of claim 1, wherein the first blocks comprise a greater amount of comonomer-derived units than the second blocks by at least 6 mol %.

20. The elastomeric article of claim 1, wherein the first blocks comprise a greater amount of comonomer-derived units than the second blocks by at least 8 mol %.

21. An elastomeric article comprising an olefin-block copolymer comprising within a range from 4 to 40 mol % of C4 to C12 α-olefin derived units and ethylene-derived units, wherein the olefin-block copolymer has a melting point temperature ($T_{m2}$) from 92° C. to 120° C., an $M_w/M_n$ value of less than 2.5, and a mechanical hysteresis of less than 50% at 37° C.

22. The elastomeric article of claim 21, wherein the olefin-block copolymer comprises a plurality of C4 to C12 α-olefin rich blocks comprising from 20 mol % to 80 mol % of the C4 to C12 α-olefin derived units and a plurality of the C4 to C12 α-olefin poor blocks comprising from 40 mol % to 5 mol % of the C4 to C12 α-olefin derived units.

23. The elastomeric article of claim 21, wherein the C4 to C12 α-olefin derived units comprise 1-hexene.

* * * * *